C. A. WOLFF.
Dough-Mixers.
No. 220,690. Patented Oct. 14, 1879.
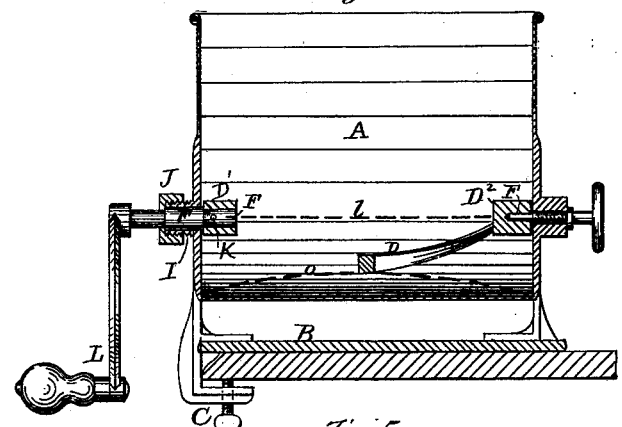
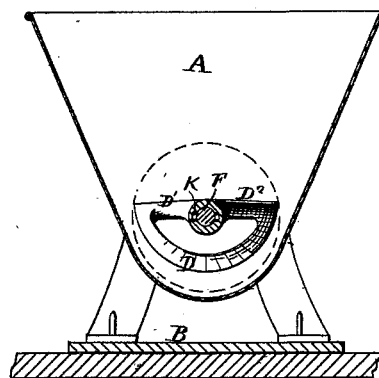
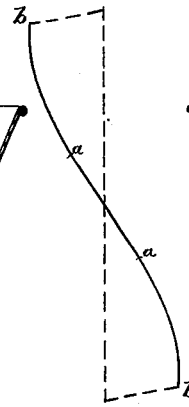
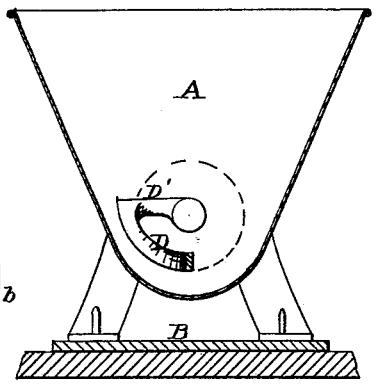
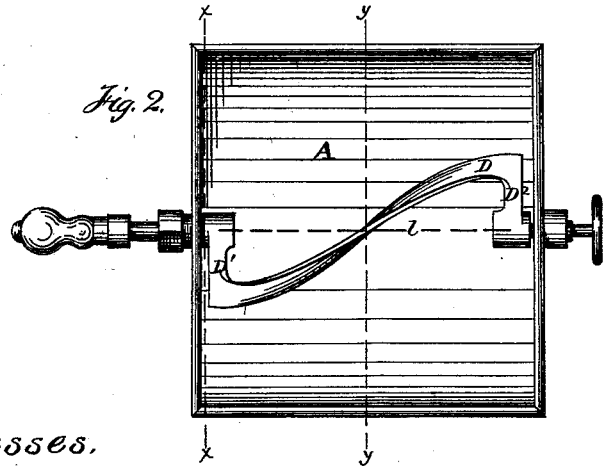
Witnesses.
Geo. W. Pierce
E. B. Fairchild
Inventor.
C. A. Wolff
by Wright & Brown
Attys

UNITED STATES PATENT OFFICE.

CHARLES A. WOLFF, OF BOSTON, MASSACHUSETTS.

IMPROVEMENT IN DOUGH-MIXERS.

Specification forming part of Letters Patent No. 220,690, dated October 14, 1879; application filed June 25, 1879.

*To all whom it may concern:*

Be it known that I, CHARLES A. WOLFF, of Boston, in the county of Suffolk and State of Massachusetts, have invented certain Improvements in Dough-Mixers, of which the following is a specification.

This invention has for its object to provide a simple, convenient, effective, and easily-operated apparatus for mixing dough, adapted to act uniformly on all parts of a mass of dough and reduce it to a homogeneous condition.

To these ends my invention consists in the combination of a receptacle for dough and a spiral blade or agitator adapted to rotate therein, said blade or agitator being peculiarly formed, as hereinafter described, to produce a constantly-varying movement of different parts of the mass of dough and thoroughly mix and agitate the same, all of which I will now proceed to describe and claim.

Of the accompanying drawings, forming a part of this specification, Figure 1 represents a longitudinal section of a dough-mixer embodying my invention. Fig. 2 represents a plan view of the same. Figs. 3 and 4 represent transverse sections on lines $x\,x$ and $y\,y$, Fig. 2. Fig. 5 is a diagram representing the pitch of the spiral blade.

Similar letters of reference indicate like parts in all of the figures.

In the drawings, A represents a receptacle of sheet metal or other suitable material. The bottom of said receptacle is concave transversely and straight longitudinally, and its sides are preferably inclined, as shown. The receptacle is supported on a suitable base, B, which is preferably provided with one or more clamps, C, for securing the base to a table.

D represents the blade or agitator, which is composed of a metal bar, preferably about half an inch in width, bent into a spiral form and supported at its ends by arms $D^1\,D^2$, which extend inwardly to a point which may be called the axial line of the blade. Said line is represented by the dotted line $l$, and is about equidistant from all parts of the concave bottom of the receptacle. Said arms are of equal length, and are supported by removable journals $F\,F'$, passing through the ends of the receptacle and entering sockets in the arms. These journals are in line with each other, and their centers are on the line $l$, said journals being equivalent to a continuous shaft passing throug the receptacle from end to end parallel with the bottom thereof.

The journal F passes through a threaded sleeve, I, on the end of the receptacle, on which is screwed a stuffing-box, J, which prevents the escape of dough; and said journal is provided with a pin, K, which enters a recess in the socket of the arm $D^1$, and insures the rotation of the blade by the crank L, which is attached to the journal F. The journal F is screwed into a threaded collar on the opposite end of the receptacle, and forms a non-rotating support for the arm $D^2$.

The blade D has the following peculiarities of construction: First, it has what I term a "varying radius"—that is to say, it is nearer the axial line $l$ at its center than at its ends by about three-fourths of an inch, and its distance from said axial line gradually increases from the center to the ends, so that as the blade rotates the successive points with which its outer edge will come in contact longitudinally of the receptacle will be along the dotted line $o$, Fig. 1, so that a varying space will exist between the bottom of the receptacle and the outer edge of the blade; second, the blade has a varying pitch—that is to say, along its central portion its lateral curvature or pitch is less than near its ends, so that when the pitch of the blade is developed on a flat surface, as shown in Fig. 5, it will show an approximately straight portion, $a\,a$, along the center, and portions of greater curvature, $a\,b\,a\,b$, at the ends.

It will be seen that the blade D when rotated acts as a conveyer to push the contents of the receptacle A toward one end or the other of the receptacle, according to the direction of rotation of the blade, so that a mass of dough in the receptacle will be given a constant longitudinal movement by the blade.

The varying radius of the blade produces the following results: First, it enables a greater quantity of the dough to accumulate under the center than under the ends of the blade, the weight of this accumulation preventing the dough from adhering in a mass to the blade and rotating with the latter without being cut or mixed; second, it causes the blade to cut through different portions of the longitudinally-moving dough at each rotation of the blade, as will be readily seen, thereby insuring the mixing or stirring of all parts of the mass.

The varying pitch of the blade causes it to move the dough more slowly at the center than at the ends of the receptacle, this differential movement facilitating the thorough intermixture of all parts of the mass of dough. In fact, the operation of the blade is such that no portion of the dough can remain at rest while the blade is rotating, the dough being in constant movement and constantly changing its position with relation to the blade, so that all parts are stirred with perfect uniformity.

The form of the blade and its arms is such that it can be readily removed from the dough and cleaned, and the described devices for securing the blade in the receptacle allow the blade to be readily detached.

I do not limit myself to the use of the described device as a dough-mixer, for I believe it to be equally well adapted for use as a churn and as a butter-worker.

The varying pitch of the blade may be dispensed with, if desired, as it is not absolutely essential to the successful working of the apparatus, although it materially facilitates the operation.

I claim as my invention—

1. In combination with a receptacle, A, the rotary spiral blade or agitator D, having a varying radius, whereby its ends are enabled to more nearly approach the bottom of the receptacle than its central portion, and a deeper deposit of dough below the reach of the blade is permitted at the center than at the ends of the receptacle, substantially as and for the purpose specified.

2. In combination with a receptacle, A, the rotary spiral blade or agitator D, formed as described, to more nearly approach the bottom of the receptacle at the center than at the ends, and to move the dough lengthwise of the receptacle more slowly at the center than at the ends, substantially as and for the purpose specified.

In testimony whereof I have signed my name to this specification in the presence of two subscribing witnesses.

CHARLES A. WOLFF.

Witnesses:
C. F. BROWN,
GEO. W. PIERCE.